April 23, 1940.  J. V. CAPUTO  2,198,265

APPARATUS FOR ELECTRIC WELDING

Filed Nov. 2, 1933  8 Sheets-Sheet 1

Fig. 1

INVENTOR
James V. Caputo
by his attorneys
Byrnes, Stebbins, Parmelee & Blenko

April 23, 1940.  J. V. CAPUTO  2,198,265
APPARATUS FOR ELECTRIC WELDING
Filed Nov. 2, 1933    8 Sheets-Sheet 6

INVENTOR
James V. Caputo
by his attorneys
Byrnes, Stebbins, Parmelee & Blenko

April 23, 1940.　　　　J. V. CAPUTO　　　　2,198,265
APPARATUS FOR ELECTRIC WELDING
Filed Nov. 2, 1933　　　8 Sheets-Sheet 7

INVENTOR
James V. Caputo
by his attorneys
Byrnes, Stebbins,
Parmelee & Blenko

April 23, 1940.  J. V. CAPUTO  2,198,265
APPARATUS FOR ELECTRIC WELDING
Filed Nov. 2, 1933   8 Sheets-Sheet 8

INVENTOR
James V. Caputo
by his attorneys
Byrnes, Stebbins, Parmelee & Blenko

Patented Apr. 23, 1940

2,198,265

UNITED STATES PATENT OFFICE 2,198,265

APPARATUS FOR ELECTRIC WELDING

James V. Caputo, Girard, Ohio

Application November 2, 1933, Serial No. 696,332

18 Claims. (Cl. 219—4)

My invention relates to the art of electric welding and, in particular, to the manufacture of structural shapes, such as beams, channels, Z's, T's, and the like, by a continuous welding process of the resistance or flash type.

It has been proposed heretofore to manufacture structural shapes by welding substantially flat plates together to form shapes having the usual webs and flanges, since shapes can be manufactured thus more cheaply than by the old method of rolling the shapes in one piece by means of a series of grooved rolls. As far as I am aware, however, no effort has been made to manufacture shapes by welding on a commercial scale and I attribute this fact to the lack of a satisfactory machine for carrying out welding operations at speeds which would make the method commercially feasible.

I have invented an apparatus for continuously welding structural shapes from substantially flat plates at high speed. My invention also contemplates a novel method of effecting the welding operation. In accordance with my invention, I provide a welding machine having electrodes adapted to engage plates adapted to form the flanges and webs of structural shapes, to supply current across the joint between the plates, with the result that the plates are welded into an integral member. The electrodes are supported for adjustment to and from the work and suitable connections are provided for the necessary current supply source. I preferably provide top and bottom electrodes and a pair of side electrodes cooperating therewith. Driving means for the electrodes are also provided. The structure of my electrode for welding shapes is also novel and the same is true of guides which I provide for facilitating entry of the plates between the electrodes and the exit of the finished article therefrom.

My invention also includes certain novel steps in the welding method itself. These and other details of the invention will be pointed out in greater detail in the following description. For a complete understanding of the invention, reference is made to the accompanying drawings in connection with said description. The drawings illustrate a present preferred embodiment of the invention and certain phases of the method which I prefer to practice. In the drawings:

Referring now in detail to the drawings and, for the present, to Figures 1 through 5, it will be observed that the welding machine of my invention comprises a base 10 having pairs of columns 11, 12, 13 and 14 extending upwardly from opposite sides thereof. A head 15 is supported by the columns 11 and 12 and a similar head 16 by the columns 13 and 14. The columns 12 and 13 also support a head 17 resting on the heads 15 and 16. A bottom bearing carriage 18 is carried on the columns 12, 13 and 14 for guided vertical movement. The carriage is supported and adjusted vertically by means of screws 19 traversing nuts 20 seated in the base 10. The screws 19 are driven by a motor 21 through the reduction gearing 22 and 23. A resilient cushion is interposed between the ends of the screws 19 and the carriage 18 to avoid undue stress resulting from irregularities in the material being welded.

The carriage 18 is provided with bearing housing 24. A bottom electrode 25 is rotatably supported on the carriage 18 in bearings within the housings 24. The construction of the electrode and its supporting trunnions, as well as the drive therefor, will be explained in more detail later. A top bearing carriage 26 is movable vertically of the columns 11, 12 and 13. The carriage is supported from the head 17 by hangers 27. Springs 28 provide a resilient support for the hangers. Adjusting screws 29 are provided for effecting vertical movement of the carriage 26. The screws engage the carriage through spring cushions 30. The adjusting screws 29 are driven by a motor 31 through reduction gearing 32 and 33. The screws 29, of course, traverse nuts seated on the head 17 in the same manner as the nuts 20 carried in the base 10. An electrode 34 similar to that shown at 25 is supported in the carriage 26.

It will be apparent that the carriages 18 and 26 are similar except for the means by which they are supported. The details of the construction of the electrodes and the supports therefor on the carriages may best be observed in Figure 5, which shows the carriage 26. Both carriages have bearing boxes 35 for anti-friction bearings, the bearings being separated from the boxes by insulation 36. The electrodes 25 and 34 have hollow trunnions 37 journaled in the bearings in the boxes 35. Each of the electrodes comprises outer discs 38 and an inner disc 39. All the discs are provided with contact rims 40. The electrode assembly is clamped together between the inner flanged ends of the trunnions 37 and clamping rings 41. A shaft 42 extends through one of the trunnions 37 and has an enlarged flange at its inner end making contact with the disc 39. The shaft 42 traverses a bearing 43. A terminal 44 is screwed into the end of the shaft 42 and coupling flanges 45 thereon bolted together. Flexible connections 46 also engage the flanges. The terminal 44 of the shaft 42 is surrounded by a mercury box 47 into which leads 48 extend from a suitable source of current supply.

Figure 5:
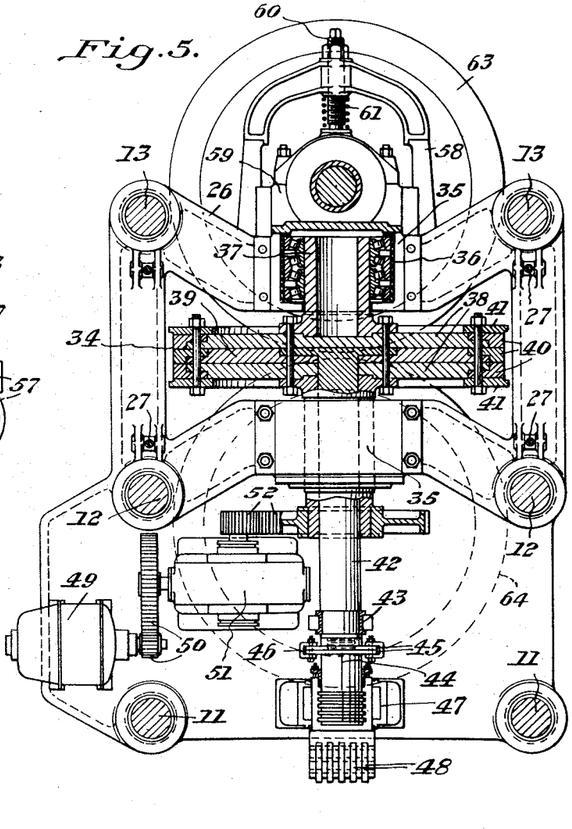
Figure 5 is a sectional view along the line V—V of Figure 1 showing parts in plan.

A motor 49 drives the electrode through reduction gearing 50, 51 and 52. The mercury box 47, motor 49 and gearing 51, of course, are insulated from the floor of the carriage 26.

The outer discs 38 of the electrodes are preferably of a high strength alloy, while the center disc is preferably copper. The rims 40 are of similar materials. The resulting electrode is thus well adapted to exert the higher pressures required in welding flat plates to form structural shapes, as well as to supply the large welding current necessary, with a minimum loss.

Figure 1:
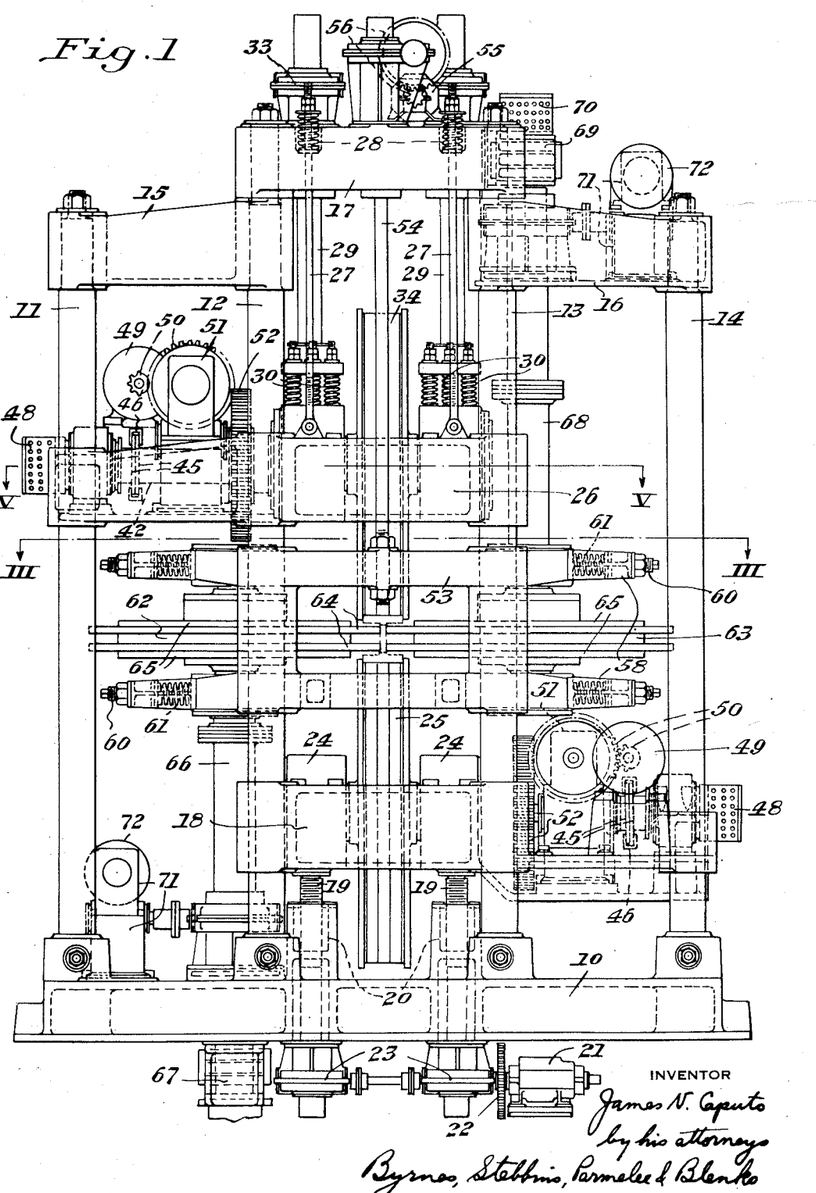
Figure 1 is an end elevation of an electric welding machine in accordance with my invention, looking thereon along the line of the path of the material adapted to move therethrough.
Figure 2:
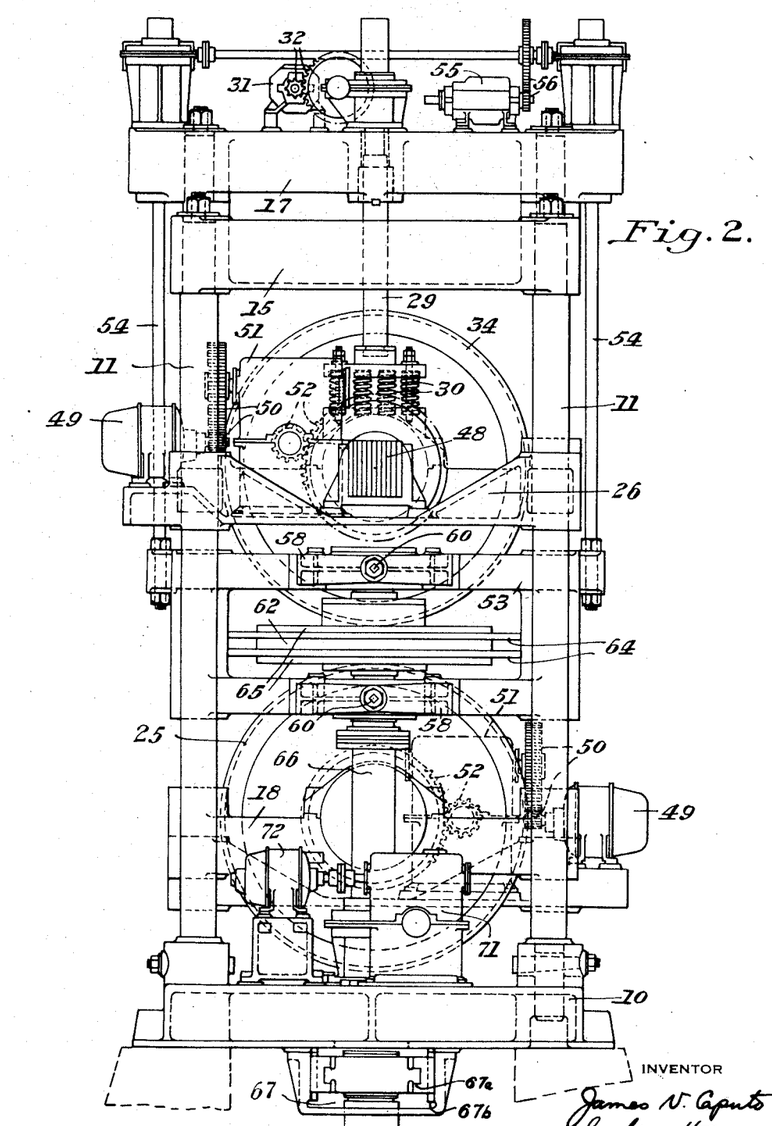
Figure 2 is a side elevation.
Figure 3:
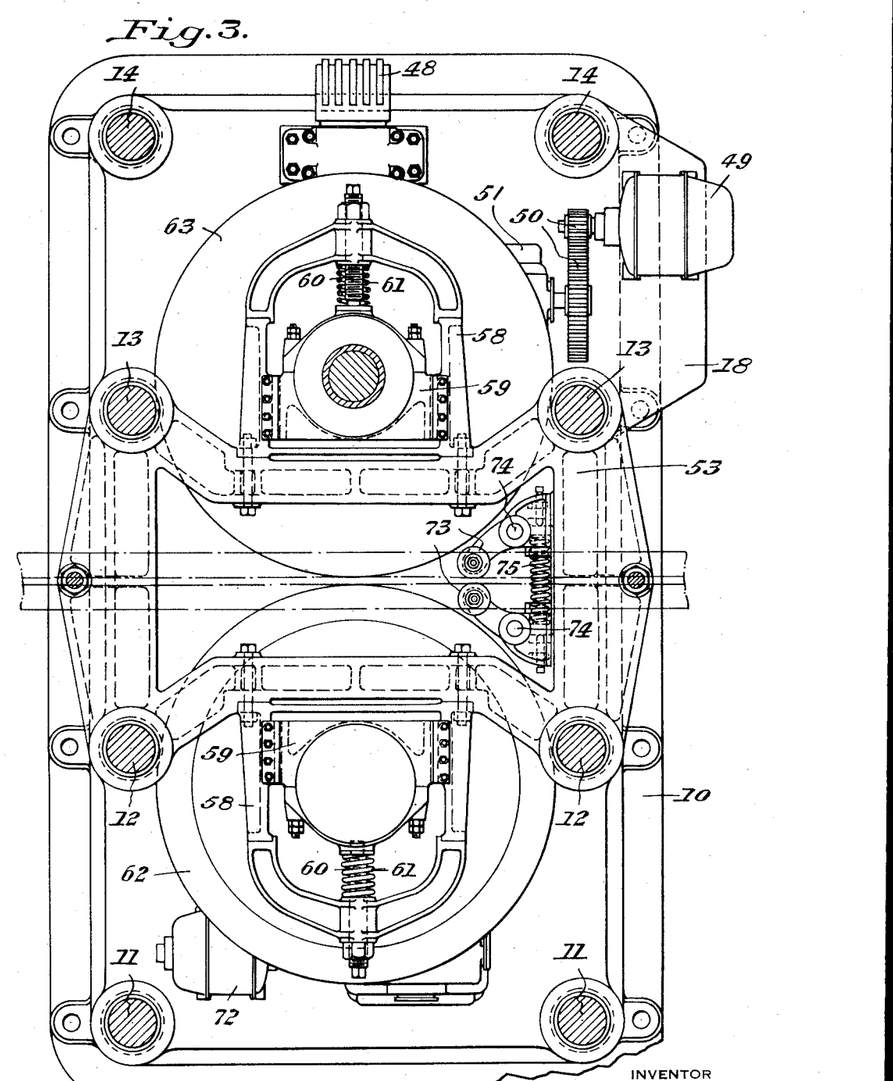
Figure 3 is a sectional view substantially along the line III—III of Figure 1 showing parts in plan.
Figure 4:
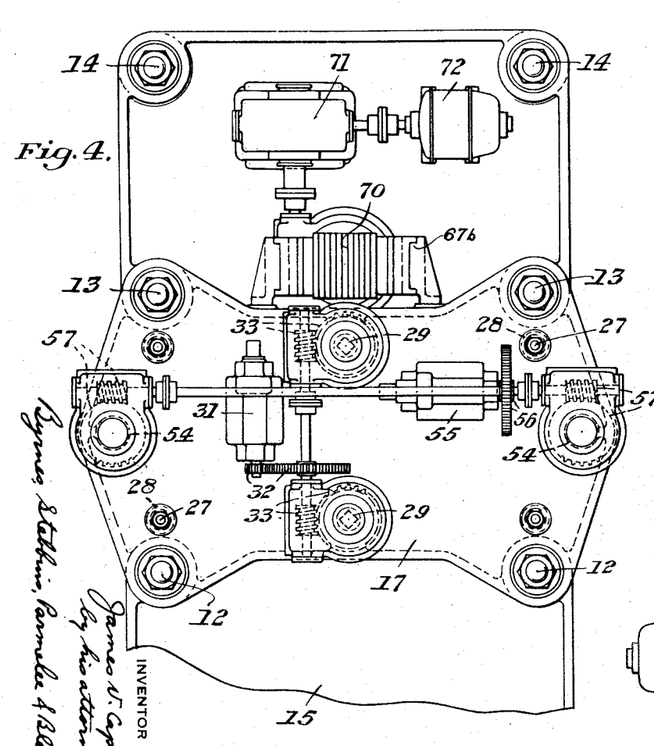
Figure 4 is a partial top plan view.

A central carriage 53 is slidable vertically on the columns 12 and 13. The carriage is suspended on screw posts 54 traversing rotatable nuts in the head 17. The nuts are driven by a motor 55 through reduction gears 56 and 57. As shown in Figure 3, two yokes 58 are attached to the carriage 53 on each side thereof. Bearing boxes 59 are adjustably carried in the yokes 58. The bearing boxes are backed up by adjusting screws 60, compression spring 61, or both, as shown in Figures 1 and 3. Electrodes 62 and 63 have trunnions journaled in bearing boxes 59, and are adapted to engage a plate forming the web of the structural shape being welded, while the electrodes 25 and 34 are adapted to engage the lower and upper flanges thereof respectively. The construction of the electrodes 62 and 63 is similar in general to that of the electrodes 25 and 34. They consist principally of an assembly of conducting discs 64 and reinforcing or strengthening discs 65 bolted together. Current is supplied to the electrode 62 through a conducting shaft 66 and a mercury box 67 having leads similar to those entering the mercury boxes 47. Similar structure for the electrode 63 includes a shaft 68, a mercury box 69 and connections 70. The boxes 67 and 69 move with their respective shaft during adjustment of the electrodes 62 and 63 to and from the work, as well as vertically by operation of the motor 55, on guides 67a and 67b. The leads to the terminals 48 and 70 are sufficiently flexible to permit the desired adjustment of the parts.

The drives for the shafts 66 and 68 are similar to the drives for the other shafts and include reduction gearing 71 and motors 72. Since the motors 72 are fixed, however, I provide the shafts 66 and 68 with splined portions working through the main driving gears, and mount the gears themselves in movable cases. The connections from the reduction gearing to the main driving gears, furthermore, include extensible couplings to permit adjustment of the shafts 66 and 68. By the means described, these shafts may be moved laterally and axially even though their driving motors and reduction gears are permanently positioned on the base 10 and head 16.

The carriage 53 is provided on the exit side with planishing rolls 73 journaled on arms pivotally mounted on bearings 74 which project upwardly of the carriage 53. The outer ends of the arms are offset below the level of the rolls 73 and a compression spring 75 engaging therebetween tends to urge the rolls 73 into firm engagement with the plates being welded, to roll down the joint therebetween, after the flash has been removed by any desired form of cutting tool. A spacer between the outer ends of the arms maintains a predetermined minimum spacing between the planishing rolls.

Figure 6:
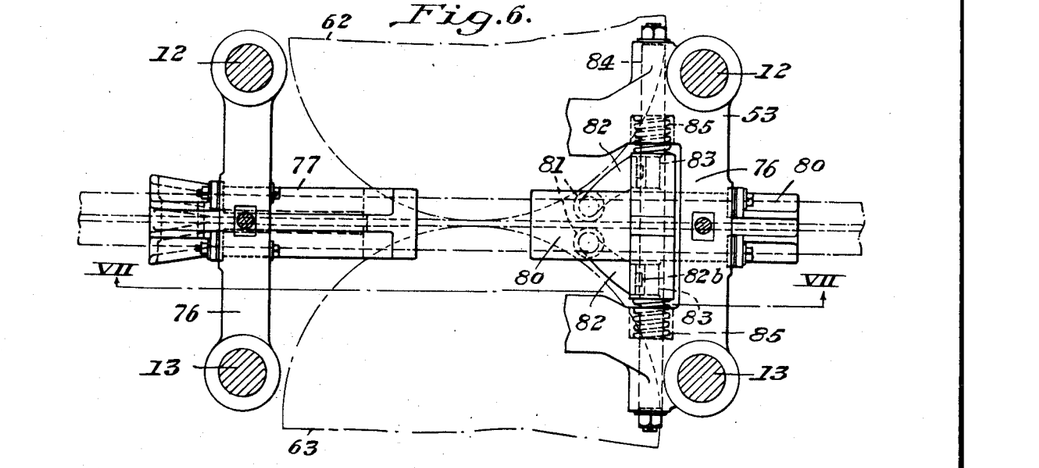
Figure 6 is a plan view of one form of guides and planishing roll supports, certain parts being broken away and other parts being shown in section.
Figures 7, 8, 9:
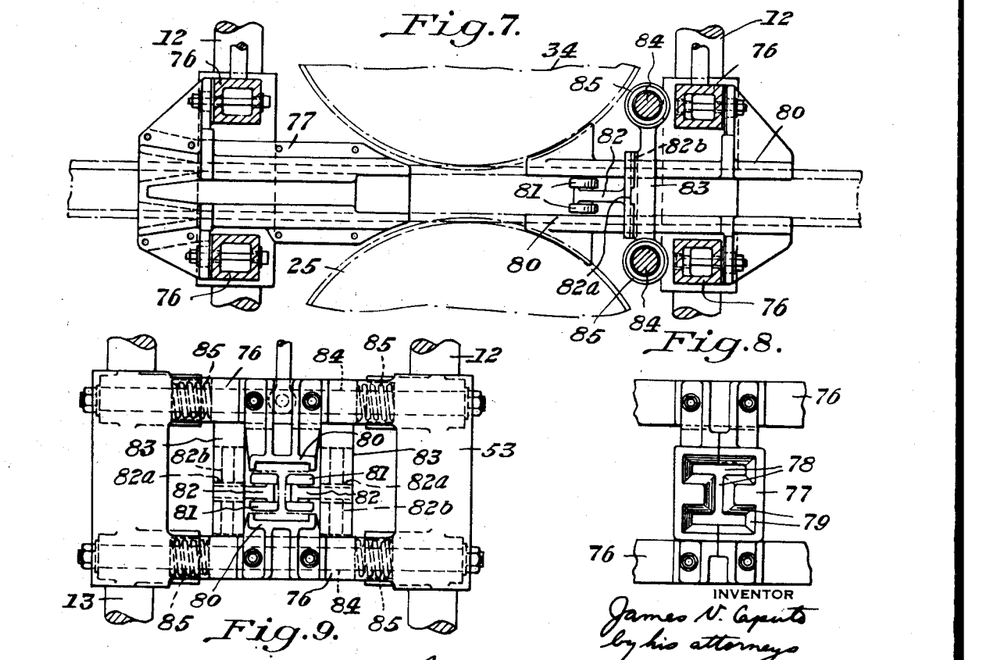
Figure 7 is a sectional view substantially along the line VII—VII of Figure 6.
Figure 8 is an end view of the guides of Figures 6 and 7 looking from the left of the latter.
Figure 9 is an end view from the other end.

Figures 6 through 8 illustrate the entering guide and a modified form of planishing rolls. The carriage 53 has transoms 76 extending between columns 12 and 13. On the entering side of the machine, the transoms 76 support an entering guide 77, preferably comprising a casting having a passage 78 correspondingly outlined to the structural shape being welded, and a tapering throat 79. The guide 77 is insulated from the carriage 53. As seen in Figure 7, the guide 77 extends between the electrodes and thus rigidly guides the plates being welded right up to the time when they are actually united by the fusion of their surfaces in contact.

On the exit side of the machine, guides 80 are adjustably carried by the transoms 76 of the carriage 53 but insulated therefrom. Planishing rolls 81 are carried on arms 82. These arms project inwardly from posts 83 which are adjustable laterally on guide bars 84 extending across the carriage 53. Springs 85 urge the posts 83 and the rolls 81 toward the work. The rolls 81 and their supporting structure constitute a construction which is alternative to the rolls 73 shown in Figure 3. The arms 82 may be adjusted vertically and horizontally on ways 82a and 82b and any convenient means may be employed for clamping them in adjusted position.

Figure 10:
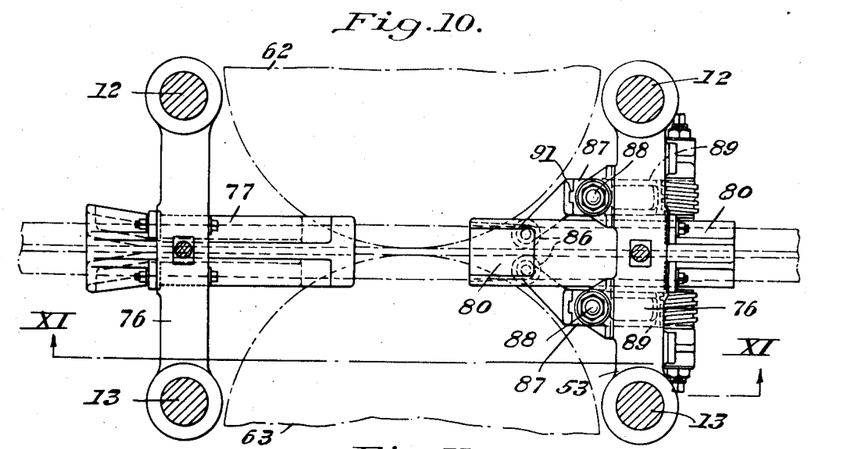
Figure 10 is a view similar to Figure 6 showing a modified construction of planishing roll support.
Figure 11:
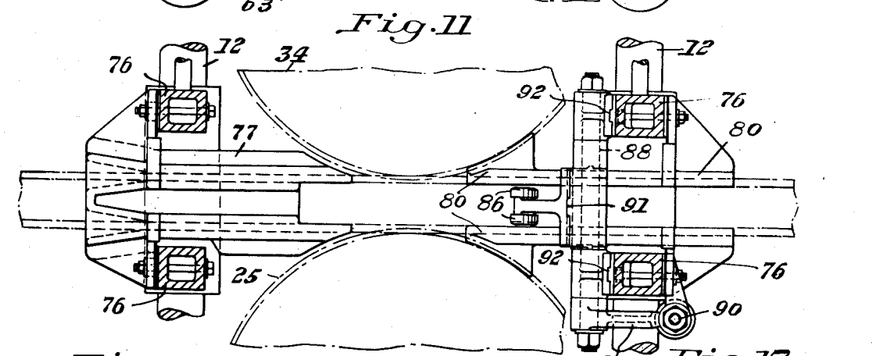
Figure 11 is a sectional view along the line XI—XI of Figure 10.
Figure 12:
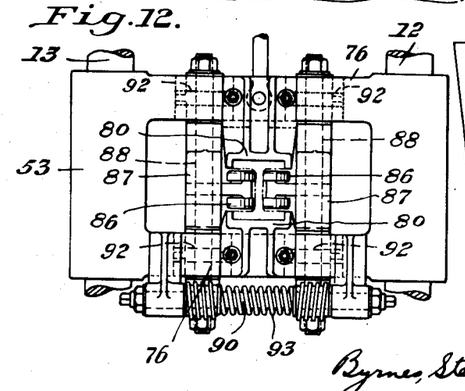
Figure 12 is an end view from the right of Figures 10 and 11.

Figures 10 through 12 illustrate the further modified form of planishing roll adjustment. The entry and exit guides shown in these figures are similar to those of Figures 6 through 9. The planishing roll adjustment is somewhat similar to that of Figure 3 in that it includes rollers 86 journaled on arms 87 which are pivoted on posts 88 supported on the carriage 53. The outer ends of the arms 87 are provided with toothed segments 89 below the level of the throat of the exit guide. The toothed segments 89 mesh with worms on a worm shaft 90 so that rotation of the shaft causes angular movement of the arms 87. The ends of the arms 87 carrying the rollers 86 are adjustable relative to the remaining portions of the arms on ways 91. The posts 88 are adjustable transversely of the carriage 53 on ways 92. The worms on the shaft 90 are splined thereto and are urged apart by a compression spring 93.

Figure 13:
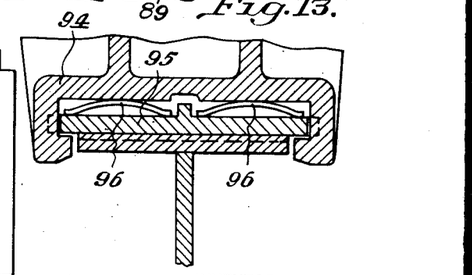
Figure 13 is a partial transverse sectional view through the exit guide illustrating a modification in detail.

Figure 13 illustrates in detail a modified form of exit guide in which the portions of the guide which actually engage the material moving therethrough are resiliently supported from the fixed portions of the guide. As shown in Figure 13, a guide frame 94 has an inner plate 95 movable therein and backed up by springs 96. The contacting surfaces of the guide frame are thus yieldable to avoid excessive strains, which might otherwise be introduced by slight variations in the dimensions of the flange or web plates.

Figures 14, 18:
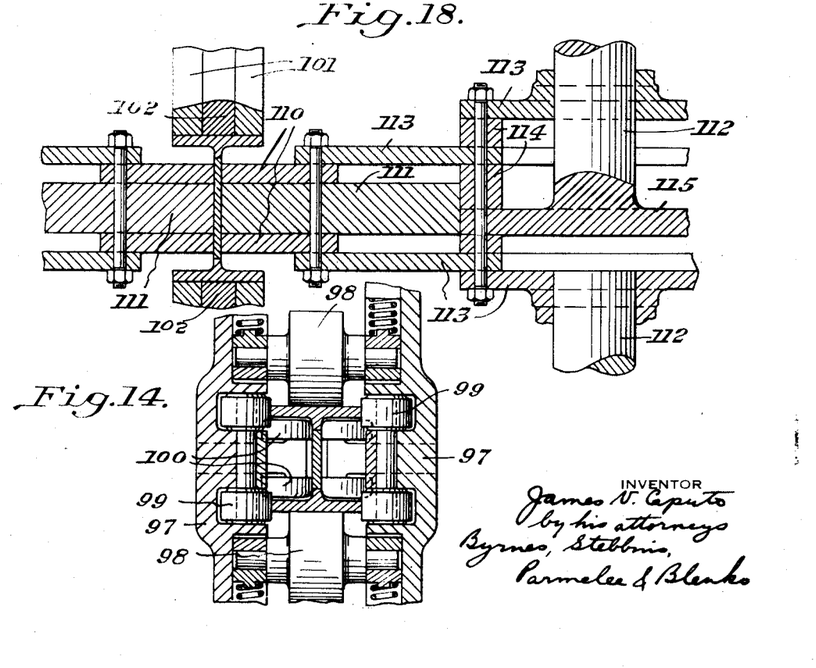
Figure 14 is a transverse sectional view through an alternative form of entering guides.
Figure 18 is a view similar to Figure 15 showing a modified form of construction for the side electrodes.

Figure 14 illustrates still another form of guides which may be placed on both the entering and exit sides of the machine. The guides of Figure 14 have housings 97 adapted to be bolted to the transoms 76 of the carriage 53. Top and bottom horizontal rolls 98 are yieldingly supported in the housings 97. Vertical rolls 99 are also journaled in the housings for engaging the edges of the flanges of the shapes being welded. Vertical rolls 100 engage the web plate, as well as the flange plates, to provide a rigid guide pass for the assembled plates. The rolls 99 and 100 may be yieldingly supported in the same manner as the rolls 98, if desired.

Figures 15, 16:
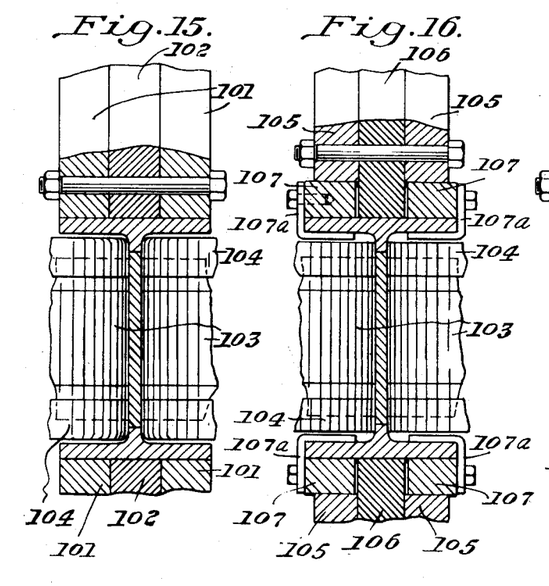
Figure 15 is a view partly in section showing the construction of a modified form of electrode.
Figure 16 is a view similar to Figure 15 illustrating a different form of electrode and typifying a modified method of operation.

Figure 15 illustrates a modified construction of the electrodes. This construction includes a pair of outer discs 101 for strength, and an inner disc 102 for conductivity. The latter is preferably copper, while the former may be any suitable alloy, preferably non-magnetic. Conducting discs 102 form parts of electrodes similar to those shown in 62 and 63. The planishing rolls shown at 104 may be supported as shown for rolls 73, 81 or 86.

Another form of electrode construction is shown in Figure 16. This is similar to that of Figure 15, except that the outer pressure-sustaining discs 105 are of smaller diameter than the central current-conducting disc 106. Pressure-transmitting shims 107 having securing clips 107a, engage the flange plates of the shapes being welded and the peripheries of the outer discs 105. The pressure exerted on the flange plates is thus sustained by the outer discs 105 without the danger of damaging the softer inner conducting disc 106, which will usually be of copper.

Figure 17:
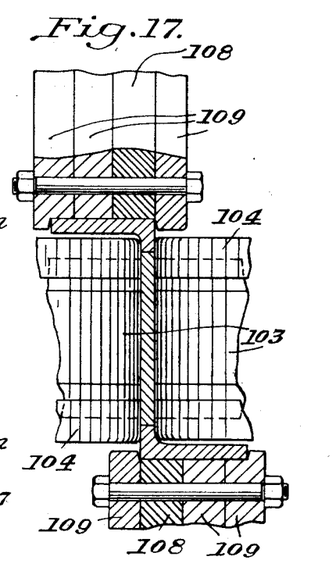
Figure 17 is a view similar to Figure 15 showing a further modification.

Figure 17 illustrates electrodes adapted for welding Z-bars. Each electrode comprises an inner disc 108 of highly conducting material such as copper, and outer discs 109 of a stronger material, which need not be of high conductivity and is preferably non-magnetic. The disc 108 is positioned so that it is in the closest possible proximity to the joint between the web and flange plates.

Figure 18 illustrates in somewhat greater detail the construction of electrodes similar to those shown in 62 and 63. In order to weld various depths of I-beams, for example, it will be desirable to have electrodes with conducting discs of different spacings. A convenient way in which this object may be obtained is shown in Figure 18. Discs 110 adapted to engage the material being welded are assembled on a central pressure-sustaining disc 111. The disc 110 should preferably be of copper, while the disc 111 will be of stronger material. The disc 111 is assembled on a shaft 112 with other highly conducting discs 113 and spacer rings 114 of similar material. By changing the spacer rings the spacing of the discs 110 may be changed to weld shapes of various depths. The shaft 112 is in two parts, one of which has a flange 115 in flat engagement with the disc 111. Alternatively, the disc 111 may be of highly conducting material, such as copper, and of substantially the same diameter as the discs 113.

Figure 19:
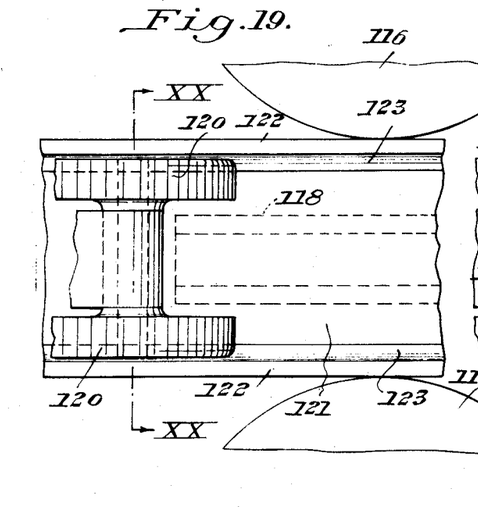
Figure 19 is a partial side elevation which is largely diagrammatic, showing the planishing rolls of Figure 14.
Figure 20:
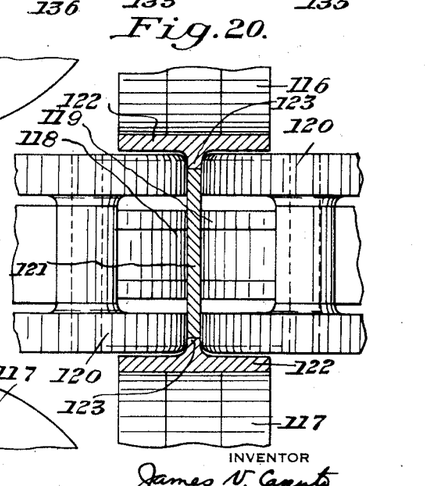
Figure 20 is a sectional view substantially along the line XX—XX of Figure 19.

Figures 19 and 20 show a further possible arrangement of planishing rolls relative to the electrodes. In these figures, top and bottom electrodes are shown at 116 and 117, while the side electrodes are shown at 118 and 119. All the electrodes are similar to the corresponding members of Figure 15. The planishing rolls shown at 120 are disposed in offset relation to the electrodes but are positioned as close thereto as mechanical clearances will permit. The planishing rolls 120 may be adjustably supported by either of the means shown at Figures 3, 6 and 10.

The method of making structural shapes from plates, as known heretofore, contemplated only the use of flat plates for the flanges and webs of the sections being made. I have discovered that in the practice of such a method, the zone of maximum temperature is not at the joint between the flange and web plates, but within the web plate itself and spaced somewhat from the edge thereof. In accordance with my invention, therefore, I do not use flat flange plates but provide the flange plates with a small rib as they are being rolled. The junction between the rib and the body of the flange plate has fillets which correspond to those of the standard structural shapes heretofore produced by rolling. The use of ribbed flange plates also places the junction between the flange and web plates at the zone of maximum temperature so that the welding is effected more quickly and more effectively than would be the case if the flange plates were perfectly flat.

Figures 21, 22, 23, 24, 25, 26:
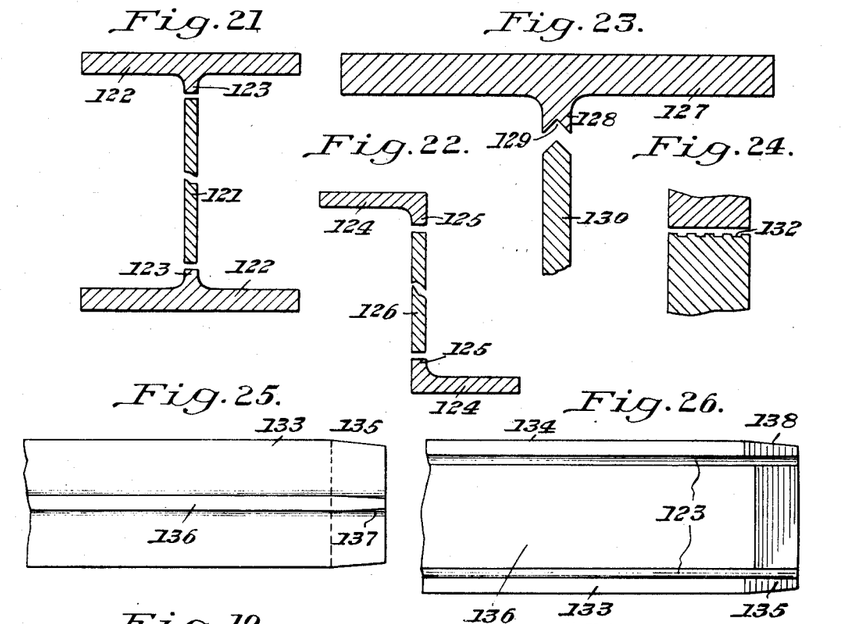
Figure 21 is a diagrammatic sectional view through an assembly of plates arranged to form an I-beam and adapted to be welded together for that purpose.
Figure 22 is a similar arrangement of plates designed to form a Z-bar.
Figure 23 is a view similar to Figure 21 showing a modified method of operation.
Figure 24 is a similar view showing a further modified method.
Figure 25 is a plan view of one of the plates adapted to constitute the flanges of a structural member.
Figure 26 is a side elevation of one end of an assembly of plates designed to form an I-beam when welded together.

Figure 21 shows a flat web plate 121 and ribbed flange plates 122 disposed thereadjacent with their ribs 123 abutting the edges of the web plate 121. It will be apparent that the ribbed flange plates can be produced almost as cheaply as perfectly flat flange plates. Figure 22 shows flange plates 124 having ribs 125 adjacent the edges thereof, for use in making Z's or other sections by welding the rib 125 to the edge of a web plate 126. The joints of Figures 21 and 22, obviously, are of the butt-weld type.

Figure 23 shows a slightly different form of joint between the web plate and the flange plate. The flange plate 127 has a rib 128 with a recess or groove 129. The web plate 130 has a projection 131 adapted to enter the recess or groove 129. This type of joint is comparable to the ordinary lapweld joint of the type shown in Figures 21 and 22.

A further modification intermediate those of Figures 21 and 23 may be employed by using standard skelp having rounded edges for the web plates, and forming the groove 129 to conform thereto, instead of the beveled edges and V-shaped groove of Figure 23. The resulting joint might be considered a compromise between butt-weld and lap-weld joints with some of the advantages of both.

Figure 24 shows a further type of joint between the flange and the web plates. According to this type, one of the plates has its edge grooved as at 132. The web and flange plates thus have contact at spaced areas and not continuously. As a result, arcs are set up which tend to cause the material to fuse more rapidly than by resistance heating.

Figures 25 and 26 illustrate the shaping of the leading ends of the plates to facilitate their entry into the guide 77. The flange plates 133 and 134 of Figures 25 and 26 have their leading ends tapered at 135. The rib 136 of the flange plates is similarly tapered at 137. The unribbed surfaces of the flange plates, furthermore, are beveled as at 138. The beveling and tapering above described not only facilitates entry of the plates into the guide but also lessens the danger of injury to the electrodes by the impact of sharp metallic edges thereon. The trailing ends of the plates may be similarly treated. As a further precauton against injury to the electrode, I may separate the opposed electrodes until the leading ends of the assembled plates have been advanced slightly beyond the plane containing the electrode axes. The electrodes may then be advanced into engagement with the plates and the latter moved forward as the welding progresses. This method of welding is made possible by the provision of means for effecting rapid and accurate adjustments of the positions of the electrodes.

It will be apparent from the foregoing description that the invention provides a method and apparatus for connecting structural shapes by welding plates together characterized by numerous advantages over anything known in this art heretofore. The welding machine proper has several particularly outstanding features. In the first place, all parts of the machine can readily be adjusted for different sizes and shapes. It is contemplated, of course, that different electrodes and guides will be employed for different sizes and shapes. The electrodes are firmly held in adjusted position at all times but the spring backing thereof permits yielding to accommodate variations in the established dimensions within permitted tolerances. The structures forming part of the circuit from the welding current source are all insulated from the main frame to prevent short-circuiting. The current is supplied to the arc symmetrically and an effective weld is produced at high speed. Any suitable type of current source may be employed. Separate sources may be provided for the two pairs of electrodes, top and side and bottom and other side, or they may be connected in parallel to a common source.

The construction of the machine is open so that all parts thereof are readily accessible for inspection and maintenance. Ease of control and supervision are additional features of importance characterizing the invention. The machine has ample strength and the frame sufficient rigidity to withstand all the severe stresses to which it is normally subject in operation. Very high pressures can be brought to bear on the material being worked without over-straining the parts of the machine.

The method of my invention is more efficient in forming welded structural shapes than any previous method with which I am familiar and, at the same time, the low cost and high production rate which can be attained are large factors in its favor. The necessary shaping of the flange plates can be easily effected. The assembled plates are rigidly maintained in the proper relation at all times until firmly secured together by the completion of the welds at joints between the flange and web plates.

While I have illustrated and described herein but one preferred embodiment of my invention and one preferred practice thereof, with certain modifications, it will be apparent that many changes in the apparatus and method described herein may be made without departing from the scope of the invention or the spirit of the appended claims.

I claim:

1. In a welding apparatus, a frame, top and bottom carriages movable vertically of said frame, said carriages being suspended and supported from the top and bottom of the frame, respectively, disc electrodes journaled on parallel axes on said carriages for rotation in a substantially vertical plane, an intermediate carriage between the two said first-mentioned carriages, and a disc electrode journaled on said intermediate carriage with its axis substantially in the plane of said axes for rotation in a substantially horizontal plane.

2. In a welding apparatus, a frame, a carriage adjustable vertically thereof, a shaft journaled on the carriage, an electrode mounted on the shaft, a motor on said carriage geared to said shaft, a shaft terminal comprising an extension of said shaft also journaled in said carriage, means electrically connecting said shaft to the extension, a mercury box embracing the shaft terminal, welding current leads connected to said box, and a second carriage adjustable vertically of the frame and having an electrode cooperating with that of the first-mentioned carriage.

3. In a welding apparatus, a frame, a carriage slidable vertically thereof, a yoke extending laterally of said carriage in a substantially horizontal plane, a shaft journaled vertically in said yoke, and an electrode mounted on said shaft for rotation in a horizontal plane.

4. In a welding apparatus, a frame, a carriage slidable vertically thereon, spaced parallel yokes extending laterally from said carriage in substantially horizontal planes, bearing boxes adjustable in said yokes, a shaft journaled in bearings in said boxes, and a disc electrode mounted on said shaft for rotation in a horizontal plane.

5. In a welding apparatus, a frame including a base and a head, a carriage adjustable vertically of said frame, a pair of substantially vertical shafts journaled on opposite sides of said carriage, one shaft extending upwardly from the carriage and the other extending downwardly, driving mechanism on said base for one of said shafts, and driving mechanism on said head for another of said shafts.

6. In a welding apparatus, a frame, a carriage extending horizontally of the frame and slidable vertically thereon, yokes extending laterally of said carriage in horizontal planes, bearings adjustably seated in said yokes, a disc electrode journaled in said bearings for rotation in a substantially horizontal plane, and resilient back-ups for said bearings.

7. In a welding apparatus, a frame including columns, a carriage extending horizontally of the frame and slidable vertically on the columns, means for adjustably supporting the carriage from the frame for sliding movement on the columns, bearings on said carriage in horizontal alinement, a disc electrode rotatably supported in said bearings in a substantially vertical plane, a second carriage substantially similar to the first and having an electrode similarly mounted, means for adjustably supporting the second carriage from the frame, and a third carriage intermediate the first and second having rotatable electrodes thereon adapted to cooperate with those on the two first-mentioned carriages.

8. Apparatus for welding structural shapes from flat plates including a fixed entry guide, an opening therethrough corresponding in outline to the shape being welded, a tapering throat at the entering end of said guide, an exit guide adapted to engage the finished article as it emerges from the apparatus, and planishing rolls adjacent said exit guide for engaging the welded seams firmly at the joint between the plates composing the finished shape.

9. In an apparatus for welding structural shapes from flat plates, a frame, an exit guide carried on the frame having portions for engaging the finished shape issuing from the apparatus, planishing rolls adjustably mounted on the frame adjacent said guide for movement toward and away from the latter, and means for yieldingly forcing said rolls into contact with the seams formed at joints between the plates comprising the finished shape, said rolls extending within the outer edges of said guide to engage said joints.

10. In an apparatus for welding plates together to form structural shapes, a frame, electrode-supporting carriages adjustable on said frame, and planishing rolls adapted to engage the seams formed at joints between the plates, said planishing rolls being adjustably mounted on one of said carriages, and having means for resiliently urging the planishing rolls into engagement with the seams.

11. In a welding apparatus, an adjustable carriage, a pair of vertical posts adjustable laterally of said carriage, planishing rolls carried on said posts, and means for yieldingly urging said planishing rolls together.

12. In a welding apparatus, an adjustable supporting carriage, pivoted bearings on said carriage, arms rotatable on said bearings, planishing rolls at the inner ends of said arms, and means for yieldingly forcing the other ends of said arms apart.

13. The apparatus defined by claim 12 characterized by the fact that the outer ends of said arms are provided with toothed segments for cooperation with an adjusting screw.

14. The apparatus defined by claim 3 wherein said frame is provided with an additional carriage having a shaft journaled horizontally therein, and an electrode on said shaft, said last-mentioned carriage having an opening therein through which said electrode partially projects.

15. The apparatus defined by claim 8 wherein said exit guide comprises a pair of members spaced apart and said planishing rolls extend between said members.

16. The apparatus defined by claim 9 characterized by pivoted arms on which said planishing arms are mounted, and means for swinging said arms.

17. The apparatus defined by claim 9 characterized by supports for said planishing rolls mounted on the frame for sliding movement transversely of the path of movement of the work.

18. In a welding apparatus, a frame, top and bottom carriages mounted vertically of said frame, said carriages being suspended and supported from the top and bottom of the frame, respectively, disc electrodes journaled on parallel axes on said carriages for rotation in a substantially vertical plane, an intermediate carriage between the two said first-mentioned carriages, and a disc electrode journaled on said intermediate carriage with its axis substantially in the plane of said axes for rotation in a substantially horizontal plane.

JAMES V. CAPUTO.